(12) United States Patent
Isrel, Jr. et al.

(10) Patent No.: US 8,825,892 B2
(45) Date of Patent: Sep. 2, 2014

(54) DYNAMICALLY CALCULATING AN INBOUND BLOCKING FACTOR USING OPERATING-SYSTEM-LEVEL CONDITIONS

(75) Inventors: Maurice Isrel, Jr., Raleigh, NC (US);
Thomas D. Moore, Raleigh, NC (US);
Bruce H. Ratcliff, Red Hook, NY (US);
Jerry W. Stevens, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1253 days.

(21) Appl. No.: 12/102,458

(22) Filed: Apr. 14, 2008

(65) Prior Publication Data
US 2009/0259743 A1    Oct. 15, 2009

(51) Int. Cl.
*G06F 15/16* (2006.01)
*H04L 12/56* (2006.01)

(52) U.S. Cl.
CPC ......... *H04L 49/9068* (2013.01); *H04L 49/9063* (2013.01); *H04L 47/822* (2013.01)
USPC ............................ 709/234; 709/224; 709/235

(58) Field of Classification Search
CPC ............ H04L 49/9068; H04L 49/9063; H04L 47/822
See application file for complete search history.

(56) References Cited

U.S. PATENT DOCUMENTS

| 6,889,277 | B2 | 5/2005 | Musumeci |
| 6,988,156 | B2 | 1/2006 | Musumeci |
| 2004/0228280 | A1* | 11/2004 | Moore et al. ................. 370/252 |
| 2006/0075480 | A1* | 4/2006 | Noehring et al. ............... 726/12 |

* cited by examiner

*Primary Examiner* — Thomas Dailey
*Assistant Examiner* — Nam Tran
(74) *Attorney, Agent, or Firm* — Patents on Demand P.A.; Brian K. Buchheit; Scott M. Garrett

(57) ABSTRACT

A current value of a changing operating-system-level condition can be determined, wherein the operating-system level condition is a condition of a host related to an operating system resource utilization or an operating system experienced latency. The operating-system level condition can be a condition of a layer of the OSI model above the Data Link Layer. An inbound blocking factor algorithm can execute that uses the determined current value as a variable. A value for an inbound blocking factor can be generated as a result of executing the inbound blocking factor algorithm. The generated value can be utilized as the inbound blocking factor to determine a manner in which incoming messages are to be conveyed from a network adaptor, through an adaptor interface boundary, to an operating system of the host.

19 Claims, 2 Drawing Sheets

DYNAMICALLY CALCULATING AN INBOUND BLOCKING FACTOR USING OPERATING-SYSTEM-LEVEL CONDITIONS

BACKGROUND OF THE INVENTION

The present invention relates to the field of communications across a network adaptor boundaries and, more particularly, to dynamically calculating an inbound blocking factor using operating-system-level conditions.

Computers utilize network adaptors to physically and logically connect a computer to a network. A typical network adaptor includes microcode, embedded in firmware. A network adaptor can be implemented as a network interface card (NIC), can be an embedded component of a motherboard, or can be otherwise positioned. Hardware of the network adaptor is configured to perform physical layer functions (e.g., layer one of the Open Systems Interconnection Basic Reference (OSI) model). The microcode of the network adaptor is configured to direct components of the adaptor to perform Media Access Control (MAC) sublayer functions, where the MAC sublayer is the lower sublayer of the Data Link Layer (DLL), which is the second layer of the OSI model. The MAC sublayer is responsible for data encapsulation functions including frame assembly and parsing. Additionally, The MAC sublayer is responsible for media access control including initiation of frame transmissions and recovery of the same. A network adaptor typically has an associated network adaptor driver, which is a software interface between an operating system and the network interface adaptor. The adaptor driver typically performs Logical Link Control (LLC) functions, where the LLC is the upper sublayer of the DLL.

Applications typically only deal with the topmost layers of the OSI models. Additionally, the operating system or platform often has two well defined software interfaces for network communications; one between the media and transport layers and one between the transport layers and applications. The media-to-transport interface can be an adaptor driver, which is typically implemented as a driver conforming to the Network Driver Interface Specification (NDIS) or the Open Data-Link Interface (ODI). The application-to-transport interface defines a manner in which application programs can make use of the transport layers. For example, the application-to-transport interface layer can define how a Web browser communicates with TCP/IP transport software.

In current host to network adaptor communication interfaces, blocking of messages occurs. When multiple messages are blocked, they are combined into a single larger message, which is conveyed across the adaptor interface boundary. Inbound (from adaptor to host) messages can be queued in a network card memory during an inbound blocking stage, where they are conveyed from this queue across the adaptor interface boundary to a memory of the host, where they become available (visible) to the operating system of the host. Outbound (from host to adaptor) messages can be cached in a host memory during an outbound blocking stage before these messages are conveyed to remotely located devices. Optimal blocking of messages across the adaptor interface boundary can depend upon current state information of the host and of the network adaptor. Different blocking factors can exist for inbound messages and for outbound messages.

There are many well known packing algorithms and strategies, a majority of which dynamically calculate a blocking factor, which defines a quantity of messages to be queued or cached before messages are to be conveyed across the adaptor boundary. Conventional approaches for calculating a blocking factor are based upon state information from a single direction only. That is, a blocking factor for outbound messages (from host to adaptor) is based exclusively upon operating-system-level conditions (relating to operating system state). The blocking factor for inbound messages (from adaptor to host) is based exclusively upon adaptor-level conditions (relating to an adapter state).

This approach makes some logical sense when considering the OSI model, the various layers of abstraction in existence, and the information generally available to an algorithm calculating the blocking factor, which varies depending upon which OSI level at which the algorithm executes. More specifically, the inbound blocking factor is typically calculated by microcode associated with the network adaptor executing within network adapter hardware. Thus, only dynamic link layer (DLL) or adaptor-level information (adapter state information) is by default "visible" or available to the process determining the inbound blocking factor. Similarly, the outbound blocking factor is typically calculated by operating-system-level code, which has access to operating-system-level conditions (OS state information).

Basing blocking factor calculations upon state information from a single direction, however, only considers resources that are visible from that direction. Message transfer rates for each direction can be affected by state information of the other direction. For example, a low inbound blocking factor (currently based exclusively on adaptor state information) increases CPU utilization of a host (an operating-system-level resource). A high setting for an inbound blocking factor can increase network latency. No conventional algorithm or methodology exists for dynamically calculating an inbound blocking factor that uses operating-system-level conditions (OS state information) as an algorithm variable.

BRIEF SUMMARY OF THE INVENTION

One aspect of the present invention includes a method, a computer program product, a device, and a system for calculating an inbound packet blocking factor. In this aspect, a current value of a changing operating-system-level condition can be determined, wherein the operating-system level condition is a condition of a host related to operating system resource utilization or operating system experienced latency. The operating-system level condition can be a condition of a layer of the OSI model above the Data Link Layer. An inbound blocking factor algorithm can execute that uses the determined current value as a variable. A value for an inbound blocking factor can be generated as a result of executing the inbound blocking factor algorithm. The generated value can be utilized as the inbound blocking factor to determine a manner in which incoming messages are to be conveyed from a network adaptor, through an adaptor interface boundary, to an operating system of the host.

Another aspect of the present invention can include a system for handling inbound network traffic, which includes a network adaptor, an operating system, a network adaptor interface, a blocking factor determination engine, and an inbound blocking engine. The network adaptor can communicatively link a computing device to a network. The operating system can include a set of OS-level conditions, which dynamically change based upon a state of the operating system. The network adaptor interface can function as a software interface between the network adaptor and the operating system. The blocking factor determination engine can dynamically calculate a blocking factor based at least in part upon values of the OS-level conditions. The inbound blocking engine can block incoming packets in accordance with the blocking factor determined by the blocking factor determination engine.

Still another aspect of the present invention can include a network adaptor that includes an inbound blocking processor configured to block incoming packets in accordance with a dynamically adjustable blocking factor, which is calculated based upon at least one OS-level condition.

DETAILED DESCRIPTION OF THE INVENTION

Figure 1:
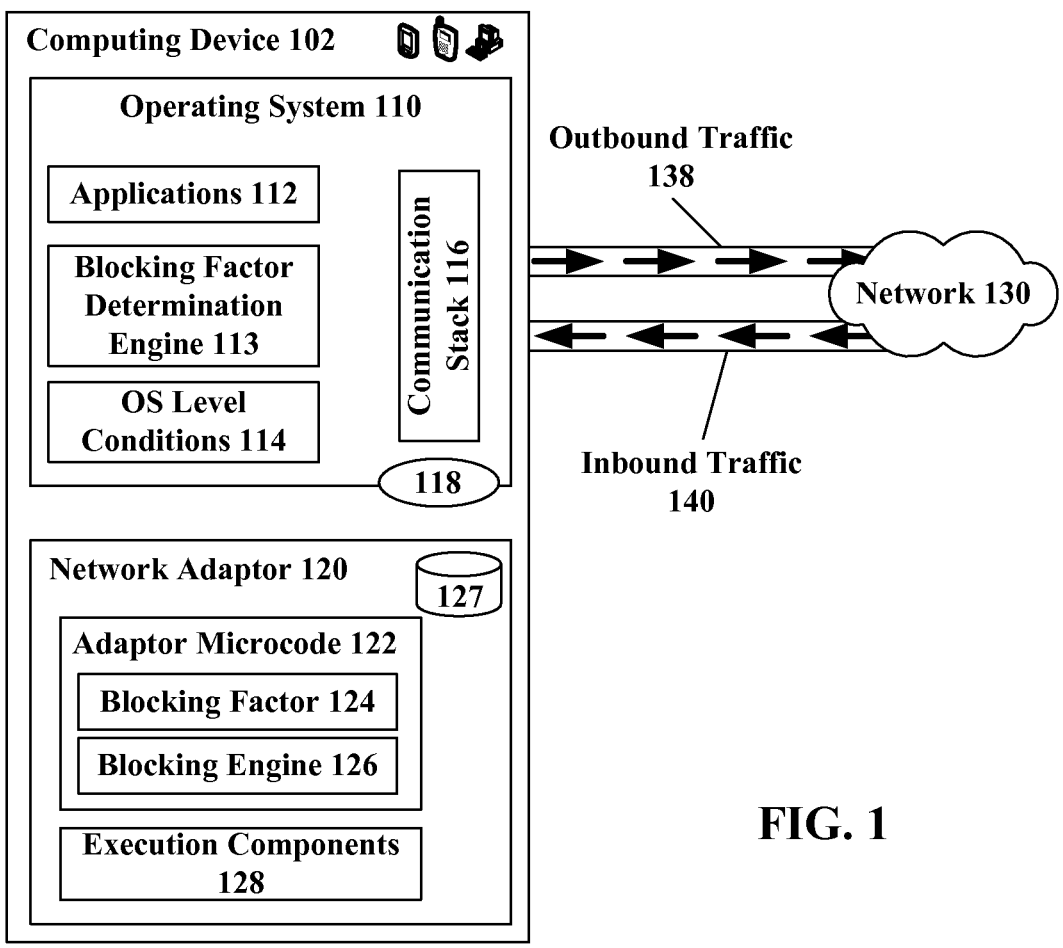
FIG. 1 is a schematic diagram of a system of a device that uses OS-level conditions to compute a dynamic blocking factor used for blocking inbound traffic 140 in accordance with an embodiment of the inventive arrangements disclosed herein.

The present invention dynamically adjusts a network adaptor's inbound blocking factor based at least in part upon operating-system-level conditions. The inbound blocking factor refers to a quantity of messages to be packed together for transport across a network adaptor boundary from a network adaptor to a host computing device. Stated differently, the inbound blocking factor determines a delay that is to occur within a network adaptor before presenting received messages (packets) across a network adaptor interface boundary to an Operating System (e.g., an OS communication stack for further processing). The inbound blocking factor can dynamically change as load or other OS condition(s) change.

Operating-system-level information is useful as a host operating system typically has a broader picture of what is occurring to all communication processing within the OS (i.e., is aware overall system performance metrics, such as utilization and latency). Traditional inbound blocking factor determination information does not advantageously utilize changing OS state information, but instead bases inbound blocking factor calculations solely upon changing adaptor-level conditions. Thus, the disclosed invention is able to more optimally determine an inbound blocking factor compared to conventional calculation methodologies.

The present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The computer usable program code may be transmitted using any appropriate medium, including but not limited to the Internet, wireline, optical fiber cable, RF, etc.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. Examples of a computer-readable medium include a semiconductor or solid state memory, magnetic tape, a removable computer diskette, a random access memory (RAM), a read-only memory (ROM), an erasable programmable read-only memory (EPROM or Flash memory, a rigid magnetic disk and an optical disk. Current examples of optical disks include compact disk-read only memory (CD-ROM), compact disk-read/write (CD-R/W) and DVD. Other computer-readable medium can include a transmission media, such as those supporting the Internet, an intranet, a personal area network (PAN), or a magnetic storage device. Transmission media can include an electrical connection having one or more wires, an optical fiber, an optical storage device, and a defined segment of the electromagnet spectrum through which digitally encoded content is wirelessly conveyed using a carrier wave.

Note that the computer-usable or computer-readable medium can even include paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a schematic diagram of a system 100 of a device 102 that uses OS-level conditions 114 to compute a dynamic blocking factor 124 used for blocking inbound traffic 140 in accordance with an embodiment of the inventive arrangements disclosed herein. The computing device 102 can be a device able to exchange data with other computing devices over a network 130. Exchanged data can be considered either inbound traffic 140 or outbound traffic 138 depending upon whether it was initiated by the computing device 102 or by a remotely located device. A blocking can occur for outbound traffic 138 that is different from the blocking used for inbound traffic 140. The invention is focused upon inbound traffic 140 blocking and, specifically, computing a dynamic blocking factor based at least in part upon values of one or more OS level conditions 114.

Inbound 140 (and outbound 138) traffic can be processed by a network adaptor 120, which performs Data Link Level (DLL) tasks in reference to the OSI model. These tasks can be physically performed by execution components 128 of the network adaptor 120 based upon adaptor microcode 122. The microcode 122 can include a blocking engine 126, which is able to utilize a computed blocking factor 124 to determine a manner in which messages are to be blocked before being conveyed to upper levels of a communication stack 116 of computing device 102. That is, the blocking factor 124 can be an inbound blocking factor that determines a quantity of incoming messages (part of incoming traffic 140) that are to be grouped or blocked together before sending the group to the OS 110. When the blocking factor 124 is set to a single message, no blocking is to occur and messages are to be sent from the adapter 120 to the OS 110 as single units.

Inbound messages, which may or may not be blocked depending upon the blocking factor 124, can be conveyed from a queue 127 through a network interface 118, and placed in the communication stack 116 for use by the operating system 110 and application instances 112 executing on top of the operating system 110. The inbound blocking factor 124 can be computed by the blocking factor determination engine 113 based at least in part upon OS level conditions 114. A computed value for the blocking factor 124 can be conveyed through the network interface 118 for use by the blocking engine 126.

It should be appreciated that the inventive arrangements shown in system 100 represent one contemplated embodiment and that derivatives and alternates to these arrangements are contemplated and are to be considered within scope of the invention. For example, in one embodiment, the blocking factor determination engine 113 can be implemented in microcode 122 using components 128, where values of the OS level conditions 114 are made available to the network adaptor 120 code 122 and/or components 128. System 100 can be configured to conform to any of a variety of protocols, such as the IEEE 802.1, 802.2, and 802.3 based protocols.

As used herein, the blocking factor determination engine 113 is an executable capable of calculating the blocking factor 124 based at least in part upon one or more OS level condition 114. In other words, the inbound blocking factor 124 value can dynamically change as the OS level conditions 114 change. The engine 113 can utilize any of a variety of mathematical algorithms to determine the blocking factor 124, so long as one of the variable of the used algorithm is a OS level condition 114 subject to change. Additional variable conditions and values can be used by the mathematical algorithms that the engine 113 uses in its calculations, which include adaptor-level (DLL level conditions) variables, user configurable values/variables, application 112 specific variables, and the like.

The OS level conditions 114 relevant to system 100 can be those conditions having an effect on inbound traffic 140. The OS level conditions 114 can relate, for example, to memory, available CPU cycles, and/or latency. Conditions 114 can include, but are not limited to, queue depth, traffic rate, an availability of storage, a maximum acceptable latency, and the like.

The blocking engine 126 can process inbound traffic 140. This processing can cause one or more incoming messages to be queued in queue 127 so that it can be combined with one or more other messages in accordance with the blocking factor 124 before being conveyed to the communication stack 116.

The execution components 128 can include all hardware, firmware, and software needed to perform adaptor 120 functions. The components 128 can represent component on a discrete network interface card (NIC) or a set of network purposed components embedded in a motherboard. The adaptor 120 can be a wireless or wire-line adaptor.

The network adaptor interface 118 can be implemented as a driver conforming to the Network Driver Interface Specification (NDIS), the Open Data-Link Interface (ODI), or any other such standard.

Operating system 110 can be software that manages the sharing of the resources of a computing device 102 and provides an interface for programs 112 to access those resources. Operating system 110 can include, but are not limited to, UNIX, ZOS, MAC OS, WINDOWS, PALM OS, WINDOWS CE, and the like.

Computing devices 102 can be any computing device capable of network communications using a network transceiver (adaptor 120). For example, computing device 102 can include a desktop computer, a laptop, a gaming console, a mobile phone, a network router or switch, a personal data assistant, a NAS device, a SAN device, and the like.

Network 130 can include any hardware/software/and firmware necessary to convey digital content encoded within carrier waves. Content can be contained within analog or digital signals and conveyed through data or voice channels and can be conveyed over a personal area network (PAN) or a wide area network (WAN). The network 130 can include local components and data pathways necessary for communications to be exchanged among computing device components and between integrated device components and peripheral devices. The network 130 can also include network equipment, such as routers, data lines, hubs, and intermediary servers which together form a packet-based network, such as the Internet or an intranet. The network 130 can further include circuit-based communication components and mobile communication components, such as telephony switches, modems, cellular communication towers, and the like. The network 130 can include line based and/or wireless communication pathways.

Figure 2:
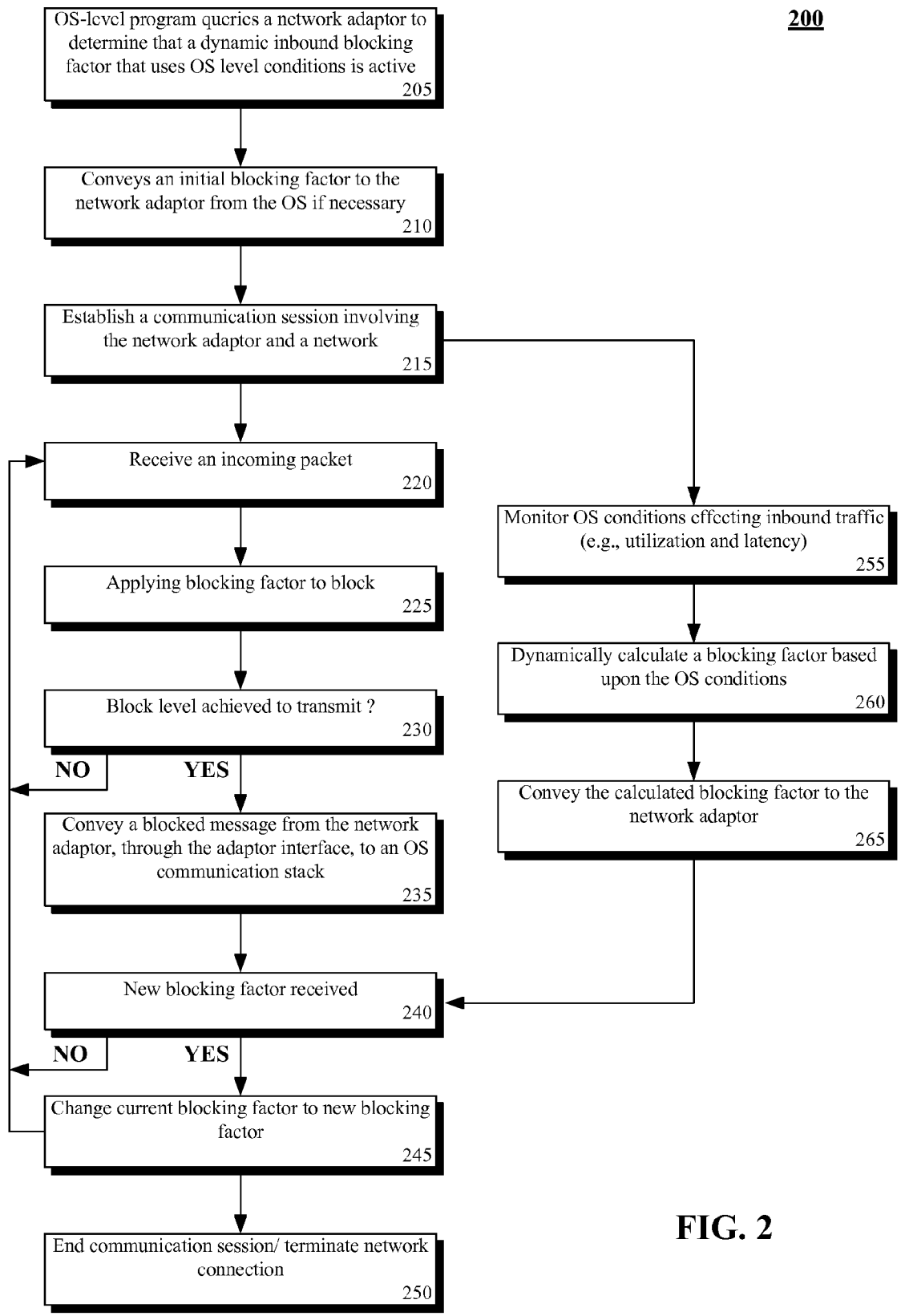
FIG. 2 is a flow chart of a method for using OS-level conditions to dynamically adjust an incoming blocking factor in accordance with an embodiment of the inventive arrangements disclosed herein.

FIG. 2 is a flow chart of a method 200 for using OS-level conditions to dynamically adjust an incoming blocking factor in accordance with an embodiment of the inventive arrangements disclosed herein. The method 200 can be performed in a context of system 100 or other such system.

Method 200 can begin in step 205, where an OS level program queries a network adaptor to determine that a dynamic inbound blocking factor that uses OS level conditions is active. This can be an optional setting that can be enabled or disabled, where when disabled, traditional adaptor-side blocking factor calculations can be performed. In step 210, an initial blocking factor (or default blocking factor) can be conveyed to the network adaptor from the OS, if necessary. This step can be unnecessary when a default blocking factor is established within an adaptor memory.

In step 215, a communication session involving the network adaptor and a network can be established. At this point, both network adaptor side processes and OS side processes can execute. From the adaptor side, an incoming packet can be received in step 220. In step 225, a blocking factor can be applied to block this (these) incoming packet(s). When a block level necessary for transmission is not achieved, additional packets of information can be received in step 220. When transmission of blocked messages is indicated in step 230, the method can proceed to step 235, where the blocked message can be conveyed from the network adaptor, through an adaptor interface, to an OS communication stack.

A new blocking factor can be selectively received in step 240, in which case, a current blocking factor is changed to the new blocking factor, as shown by step 245. After which, additional incoming packets can be received and processed, as shown by progressing from step 245 to step 220. When no new blocking factor is received, the method can progress from step 240 to step 220, where incoming traffic can be processed using the existing blocking factor.

In step 255, OS conditions can be monitored that effect inbound traffic. These conditions can relate to resource utilization and latency. In step 260, a blocking factor can be dynamically calculated based upon the OS conditions. This calculated blocking factor can be conveyed to the network adaptor in step 265. The method 200 can continue processing incoming information, while dynamically adjusting the inbound blocking factor to reflect changing OS conditions. When the communication session is terminated for whatever reason, software routines can execute to ensure the termination occurs gracefully, as illustrated by step 250.

The diagrams in FIGS. 1-2 illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for calculating an inbound packet blocking factor comprising:
   determining a current value of a changing operating-system-level condition, wherein the operating-system level condition is a condition of an operating system of a host related to an operating system resource utilization or an operating system experienced latency, and wherein the operating-system level condition is a condition of a layer of an Open Systems Interconnection Basic (OSI) model above the Data Link Layer (DLL);
   executing, by the operating system, an inbound blocking factor algorithm that uses the determined current value as a variable;
   generating, by the operating system, a quantity for an inbound blocking factor as a result of executing the inbound blocking factor algorithm;
   conveying the inbound blocking factor to a network adapter associated with the operating system through an adaptor interface boundary; and blocking incoming messages together in a block at the network adapter;

conveying the block to a communication stack of the operating system from the network adapter through the adaptor interface boundary upon a quantity of messages in the block reaching the quantity of the inbound blocking factor;

determining a present value of a changing adaptor-level condition, wherein the adaptor-level condition is a condition of a network adaptor at the Data Link Layer of the OSI model, wherein the inbound blocking factor algorithm further uses the determined present value as a variable that affects the generated quantity utilized as the inbound blocking factor.

2. The method of claim 1, further comprising:

dynamically repeating determining of the current value, executing of the inbound blocking factor algorithm, generating of the quantity for the inbound blocking factor, and conveying the inbound blocking factor to the network adapter to ensure the inbound blocking factor used by the network adapter is current with the operating-system-level condition.

3. The method of claim 2, wherein the operating-system-level condition indicates that the determined current value of the operating-system-level condition shows an increasing operating-side queuing level from a last iteration of the determining step, said method further comprises:

generating the quantity to have an increased inbound blocking factor compared to a quantity of the blocking factor from a last iteration of the generating step.

4. The method of claim 2, further comprising:

determining the network adaptor is placed in an inbound dynamic mode in which the operating system is permitted to dynamically adjust the inbound blocking factor;

establishing an initial value of an inbound blocking factor, which is initially used by the network adaptor;

monitoring operating system conditions related to queuing, traffic rate, and storage;

detecting a change in one of the host conditions, which causes the initial value of the inbound blocking factor to be less than optimal; and responsive to the initial value of the inbound blocking factor being less than optimal, repeating the determining, executing, generating, and conveying the inbound blocking factor to the network adaptor.

5. The method of claim 1, wherein determining the value of the current operating system level condition further comprises determining the value of at least one of a CPU availability of the host and an availability of storage at the operating system.

6. The method of claim 1, wherein the operating-system-level condition indicates a current operating system side queuing level, said method further comprising:

generating the quantity for the inbound blocking factor to be set to single message.

7. The method of claim 1, wherein the operating-system level condition is a condition reflecting a queue depth state of the communication stack of the operating system.

8. The method of claim 1, further comprising, responsive to a user input received at the operating system, disabling determining the value of the changing operating system level condition, executing the inbound blocking factor algorithm, generating the quantity, and conveying the inbound blocking factor, and wherein blocking incoming messages is performed by the network adapter using an adapter-side blocking factor calculation.

9. A system for handling inbound network traffic comprising:

a network adaptor of a computing device configured to communicatively link the computing device to a network;

an operating system instantiated in the computing device and comprising a plurality of operating system level conditions which dynamically changes based upon a state of the operating system;

a network adaptor interface configured to function as a software interface between the network adaptor and the operating system;

the operating system including a blocking factor determination engine configured to dynamically calculate a blocking factor based at least in part upon at least one operating system level condition, wherein the at least one operating-system level condition is a condition of an operating system of a host related to an operating system resource utilization or an operating system experienced latency, the blocking factor determines a quantity of incoming packets to be blocked together as a group in the network adapter wherein the operating system conveys the blocking factor to the network adaptor through the network adaptor interface and determines a present value of a changing adaptor-level condition, wherein the adaptor-level condition is a condition of a network adaptor at the Data Link Layer of the OSI model, wherein the blocking factor determination engine further uses the determined present value as a variable that affects the calculated quantity utilized as the blocking factor; and the network adaptor including an inbound blocking engine configured to block the number of incoming packets together in a group in accordance with the blocking factor determined by the blocking factor determination engine;

wherein the group of incoming messages is conveyed through the adaptor interface boundary to a communication stack of the operating system when a quantity of messages in the group equals the quantity determined by the blocking factor.

10. The system of claim 9, wherein the blocking factor determination engine is selectively enabled by a user.

11. The system of claim 9, wherein the operating system level conditions are changing conditions occurring at least at layer three of an Open Systems Interconnection Basic (OSI) model, and wherein the inbound blocking engine executes at layer two of the OSI model.

12. The system of claim 9, wherein the operating system level conditions comprise at least one of a queue depth, a traffic rate, and an availability of storage metric.

13. A network adaptor comprising:

an inbound blocking processor configured to block incoming packets in accordance with a dynamically adjustable blocking factor received from an operating system of a host with which the network adaptor is associated, which is calculated based upon at least one operating system level condition of the operating system of the host and further calculated by determining a present value of a changing adaptor-level condition, wherein the adaptor-level condition is a condition of a network adaptor at the Data Link Layer of the OSI model, wherein the determined present value is used as a variable that affects the dynamically adjustable blocking factor, and which determines a quantity of packets to be blocked together in a group before the group is forwarded to the operating system from the network adapter based on the dynamically adjustable blocking factor, and wherein the dynamically adjustable blocking factor indicates a block size of at least one packet.

14. The network adaptor of claim 13, further comprising:
a configurable setting configured to enable a user to selectively enable dynamic inbound blocking based upon the operating system level condition, wherein while dynamic inbound blocking is not enabled, the network adapter uses an adapter-side blocking factor calculation to block incoming messages.

15. A computer program product for calculating an inbound packet blocking factor, the computer program product comprising:
a non-transitory computer usable storage medium having computer usable program code stored thereon, the computer usable program code comprising:
computer usable program code configured to determine a current value of a changing operating system-level condition, wherein the operating-system level condition is a condition of an operating system of a host and is related to an operating system resource utilization or an operating system experienced latency, and wherein the operating-system level condition is a condition of a layer of an Open Systems Interconnection Basic (OSI) model above the Data Link Layer (DLL);
computer usable program code configured to execute an inbound blocking factor algorithm in the operating system, and that uses the determined current value as a variable;
computer usable program code configured to generate, in the operating system, a quantity for an inbound blocking factor as a result of executing the inbound blocking factor algorithm;
computer usable program code configured to convey the inbound blocking factor to the network adapter through an adaptor interface boundary;
computer usable program code configured to block incoming messages together in a block at the network adapter;
computer usable program code configured to convey the block to a communication stack of the operating system from the network adapter through the adaptor interface boundary upon a quantity of messages in the block reaching the quantity of the inbound blocking factor; and
computer usable program code configured to determine a present value of a changing adaptor-level condition, wherein the adaptor-level condition is a condition of a network adaptor at the Data Link Layer of the OSI model, wherein the inbound blocking factor algorithm further uses the determined present value as a variable that affects the generated quantity utilized as the inbound blocking factor.

16. The computer program product of claim 15, further comprising:
computer usable program code configured to dynamically repeat the determining of the current value, the executing of the inbound blocking factor algorithm, the generating of the quantity for the inbound blocking factor, and the utilizing of the generated quantity to ensure the utilized inbound blocking factor is current for a given operating system state.

17. The computer program product of claim 16, further comprising:
computer usable program code configured to determining the network adaptor is placed in an inbound dynamic mode in which the operating system is permitted to dynamically adjust the inbound blocking factor;
computer usable program code configured to establish an initial value of an inbound blocking factor, which is initially used by the network adaptor;
computer usable program code configured to monitor host conditions related to queuing, traffic rate, and storage;
computer usable program code configured to detect a change in one of the operating system conditions, which causes the initial value of the inbound blocking factor to be less than optimal; and
computer usable program code configured to, responsive to the initial value of the inbound blocking factor being less than optimal, repeat determining, executing, generating, and conveying the inbound blocking factor to the network adaptor.

18. The computer program product of claim 15, wherein the operating-system level condition is a condition reflecting a state of the communication stack of the operating system, wherein the incoming messages conveyed through the adaptor interface boundary are sent to the communication stack of the operating system.

19. The computer program product of claim 15, wherein the computer usable program code configured to block incoming messages together is specified within microcode digitally encoded in a memory of the network adaptor.

* * * * *